United States Patent [19]

Sparer et al.

[11] Patent Number: 4,549,010

[45] Date of Patent: Oct. 22, 1985

[54] BIOERODIBLE POLY(ORTHO ESTER) THERMOPLASTIC ELASTOMER FROM DIKETENE DIACETAL

[75] Inventors: Randall V. Sparer; Stefano A. Pogany, both of Lawrence, Kans.

[73] Assignee: Merck & Co., Inc., Rahway, N.J.

[21] Appl. No.: 625,166

[22] Filed: Jun. 27, 1984

[51] Int. Cl.[4] .............................................. C08G 65/28
[52] U.S. Cl. ................................... 528/361; 528/322; 528/367; 528/369; 528/392; 528/425
[58] Field of Search ............... 528/361, 392, 322, 367, 528/369, 425

[56] References Cited

U.S. PATENT DOCUMENTS 4,304,767  12/1981  Heller et al. ........................ 424/78

*Primary Examiner*—Harold D. Anderson
*Attorney, Agent, or Firm*—Mario A. Monaco; Michael C. Sudol, Jr.; R. Brent Olson

[57] ABSTRACT

The instant invention is directed to a bioerodible poly(ortho ester) thermoplastic elastomer prepared from:
(A) a diketene diacetal;
(B) a long-chain non-polar, flexible diol containing 4 to 22 carbon atoms; and
(C) a diol selected from the group consisting of:
  (i) diols containing at least one functional group which produces hydrogen bonding or other association, and
  (ii) rigid symmetrical diols.

4 Claims, No Drawings

BIOERODIBLE POLY(ORTHO ESTER) THERMOPLASTIC ELASTOMER FROM DIKETENE DIACETAL

BACKGROUND OF THE INVENTION

Thermoplastic elastomeric poly(ortho ester) block or random copolymers in which the reaction products of a diketene diacetal with structurally rigid diols or with diols containing at least one functional group which produces hydrogen bonding or other association to form the hard, rigid segments in a copolymer having alternating rigid and flexible segments and in which the flexible segments are synthesized by the reaction of a diketene diacetal with diols that are non-polar, are conformationally flexible and are essentially hydrocarbon in character. These copolymers are bioerodible and are useful in the fabrication of medical devices (e.g. implants, sutures) and in the fabrication of pharmaceutical dosage forms for the controlled release of drug substances inside the bodies of humans and animals. These polymers are suitable as carriers or matrices for drugs and other beneficial agents. These polymers upon contact with the environment in which they are used, degrade and release the drug biologically active agent in a predictable manner.

Poly(ortho ester) polymers are generally known in the art and are described, for example, in U.S. Pat. No. 4,304,767. The art shows that poly(ortho ester) polymers can be made by the acid catalyzed condensation reaction of diketene diacetals with diols.

It is an object of the present invention to provide bioerodible poly(ortho ester) block or random copolymers which erode in a predictable manner, are elastomeric and which are processable by thermoplastic techniques. It is another object of the present invention to provide bioerodible poly(ortho ester) copolymers that are more hydrophilic in nature than former poly(ortho ester) compositions.

Both of the above mentioned objects are accomplished by synthesizing copolymers which incorporate specific types of diols in their backbones. These diols are capable of producing strong interactions between adjacent poly(ortho ester) segments in two different ways:

(1) The diols may have rigid and highly symmetrical structures that are apt to fit easily in a crystal lattice. Thus the diols from adjacent polymer chains tend to associate with each other to form a crystalline zone in the polymer which acts as a physical tie between polymer chains.

(2) The diols may contain functionalities capable of engaging in hydrogen bonding, i.e., amides, urethanes, ureas and imides. This hydrogen bonding provides tie points between adjacent polymer chains.

Bioerodible thermoplastic elastomers are highly desirable materials from a standpoint of their ease of fabrication: they can be extruded, injection molded, transfer molded, calendered and vacuum formed. Those elastomers which are not crosslinked may be reprocessed without deterioration. Some of the proposed uses of these materials are as bioerodible material of construction for controlled release devices or biomedical applications (e.g. sutures), and as controlled erosion pharmaceutical coatings.

DESCRIPTION OF THE INVENTION

The instant invention is directed to a bioerodible poly(ortho ester) thermoplastic elastomer prepared from:
(A) a diketene diacetal;
(B) a long-chain- non-polar, flexible diol containing 4 to 22 carbon atoms; and
(C) diol selected from the group consisting of:
  (i) diols containing at least one functional group which produces hydrogen bonding or other association, and
  (ii) rigid symmetrical diols.

The instant invention in its preferred embodiment is directed to a bioerodible poly(ortho ester) thermoplastic elastomer prepared from:
(A) 60 to 95%, by weight, based on the total weight of the polymer produced, of a flexible segment prepared from a diketene diacetal and a long chain, non-polar, flexible diol containing 4 to 22 carbons atoms; and
(B) 5 to 40%, by weight, based on the total weight of the polymer produced, of a rigid segment prepared from a diketene diacetal and a rigid diol selected from the group consisting of:
  (i) diols containing at least one functional group which result in hydrogen bonding or other association, and
  (ii) rigid symmetrical diols.

Any diketene diacetal may be used. Examples are disclosed in U.S. Pat. No. 4,304,767, which is hereby incorporated by reference. The preferred diketene diacetal is of the following structure:

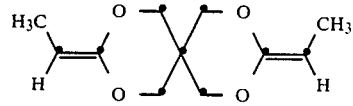

These compounds and their synthesis are described in U.S. Pat. No. 4,304,767.

The long-chain non-polar, diols are hydrocarbons having 4 to 22 carbon atoms. These diols when copolymerized with a diketene diacetal produce flexible poly(ortho ester) segments having a glass transition temperature below the temperature of application. Examples include 1,5-pentylene glycol; 1,6-hexylene glycol; 1,7-heptylene glycol; 1,9-nonylene glycol; 2,3-dimethyl-1,6-hexylene glycol; 3,6-diethyl-1,9-nonylene glycol; 1,12-dodecamethylene glycol; 1,10-decane diol; 1,2-hexadecane diol and the like.

The diols used in forming the rigid segments of these poly(ortho ester) block copolymers are the principal focus of the present invention. These diols when copolymerized with a diketene diacetal produce rigid (including semi-crystalline) poly(ortho ester) segments having a glass transition temperature of application. These diols are either highly rigid and symmetrical or they must contain in their structures one or more functional group which results in hydrogen bonding or other association, such as Van der Waals forces. Examples of functional groups which will accomplish this include: amide, urethane, urea and imide. The physical association of the above diol-structrures between rigid blocks in different polymer chains is intended to provide the interchain tie points necessary for good elastic behavior. The diols can be represented by the following formula: HO—R—OH in which R is an organic moiety containing one or more of the following functional groups:

(1) amide: —R"CONR'R"—
(2) urethane: —R"OCONR'R"—
(3) urea: —R"R'NCONR'R"—
(4) imide: —R"CONR'COR"— where R'=H or lower alkyl (1-6 carbons)

R", which may be the same or different, is an aliphatic and/or aromatic, straight chain or branched carbon atoms of 1 to 22.

Some representative diols are N,N'-bis-(2-hydroxyethyl)-terephthalamide; N,N'-bis-(2-hydroxyethyl)-pyromellitic diimide; 1,1'-methylenedi-p-phenylene)bis-[3-(2-hydroxyethyl)urea]; N,N'-bis-(2-hydroxyethyl)oxamide; 1,3-bis-(2-hydroxyethyl)-urea; 1,1-bis-(2-hydroxyethyl)urea; and bis-(2-hydroxyethyl)ethylenedicarbamate.

The above diols are known to the art in reported syntheses and most are commercially available.

Other representative diols of the formula:

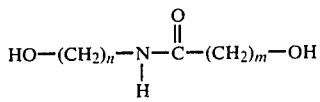

where
n=2,3,4,5,6
m=2,3,4,5 are made by the reaction of 2-amino-1-ethanol, 3-amino-1-propanol, 4-amino-1-butanol, 5-amino-1-pentanol, or 6-amino-1-hexanol with β-propiolactone, γ-butyrolactone, δ-valerolactone or ε-caprolactone.

Other representative diols of the formula:

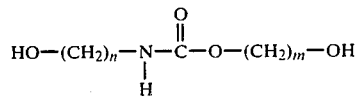

where
n=2,3,4,5,6
m=2,3,4,5,6 are made by the reaction of the same amino-alcohols of section II with cyclic carbonates of formula:

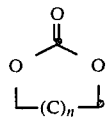

n=2,3,4,5,6

Any rigid symmetrical diol may be used in the instant invention. Examples include:

(1) the bisphenols (e.g. bisphenol-A),
(2) aliphatic diols containing an aromatic nucleus, e.g.:

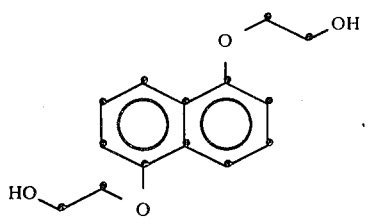

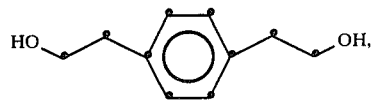

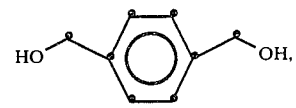

(3) hydroquinone,
(4) trans-cyclohexanedimethanol, and the like.

The rigid segments are formed by the reaction of a diketene diacetal with diols that contain functional groups capable of engaging in hydrogen bonding or other association and/or have highly rigid and symmetrical structures.

The function of the soft segment is to confer a high degree of extensibility upon the block copolymer, while the hard segment, through interchain interactions such as hydrogen bonding or association of crystalline regions, acts to tie adjacent polymer chains together by producing a "physical crosslink". This crosslinking process is thermally reversible.

Combining both hard and soft segments in a block copolymer results in thermoplastic poly(ortho ester)s with good elastic recovery. The physical crosslinking afforded by the hard segments prevents large irreversible deformations of the chains.

Up to 1% triol and higher numbered hydroxyl containing compounds may be used in order to add some rigidity to the elastomer, while retaining thermoplasticity.

The novel polymers of the invention can be synthesized by intimately contacting and reacting the diols with the diketene diacetal. The diketene diacetals and diols may be mixed simultaneously. It is preferred, however, to react a stoichiometric amount of diketene diacetal with flexible diols and react separately diketene diacetals with the rigid diols. The flexible polyorthoester segments and rigid polyorthoester segments are then subsequently reacted together. Generally, the polymerization reaction is carried out by reacting stoichiometric amounts. The amount of each reactive monomer can, of course, be from 0.9 to 1.1 moles of diol to 1 mole of diketene diacetal.

The polymerization of the monomers is carried out, in the absence of water, optionally in the presence of a catalyst, generally at a temperature of 10° C. to 220° C. until completion, generally over a reaction time of 1 hour to 96 hours.

The polymer is recovered under anhydrous conditions from the reaction vessel by conventional isolation and recovery techniques. For example, the polymer is recovered while hot by extruding or pouring, or the polymer is isolated after cooling, by dissolving it in a dry organic solvent such as benzene, carbon tetrachloride, methylene chloride, dioxane, tetrahydrofuran, toluene or xylene, followed by the addition of an organic liquid in which the polymer is insoluble or has limited solubility to precipitate the polymer. Organic liquids for this latter purpose include ether, hexane, pentane, petroleum ether, hexane heptane mixtures, and the like. The polymer can be isolated by filtering and drying under anhydrous conditions. Other methods for recovering the polymer include lyophilizing from a solvent.

Representative catalysts for performing the polymerization reaction are Lewis acids such as boron trifluoride, boron trichloride, boron trichloride etherate, boron trifluoride etherate, stannic oxychloride, phosphorous oxychloride, zinc chloride, phosphorous pentachloride, calcium acetate, antimonous oxide mixture, antimony pentachloride, antimony pentafluoride, stannous octoate, stannic chloride, diethyl zinc, and mixtures thereof. The catalysts also include Bronsted catalysts such as p-toluene sulfonic acid, polyphosphoric acid, cross-linked polystyrene sulfonic acid, acidic silica gel, and mixtures thereof. Other catalysts include neutral or basic catalysts such as tetrabutyl titanate, and titanium sodium hydrogen hexabutoxide. The amount of catalyst used is about one part catalyst to about 500 parts of the monomer. Smaller or larger amounts can also be used, such as 0.005% to about 2.0% based on the weight of the starting monomer.

The polymerization optionally can be carried out in the presence of an inert organic solvent that does not adversely affect the reaction, or the reaction can proceed in the absence of added solvent. In the latter reaction one of the reactants, for example, the polyol initially serves as the solvent. As polymerization proceeds, solvent by-product is removed from the reaction by conventional distillation, azeotropic distillation, or by distillation under vacuum. Suitable azeotropic solvents include toluene, benzene, m-xylene, cumene, pyridine, and n-heptane.

The following examples are set forth as representative methods illustrative of the spirit of the present invention. These examples are not to be construed so as to limit the scope of the invention as these and other functionally equivalent means will be readily apparent to those skilled in the subject art.

EXAMPLE 1

The block copolymerization of 3,9-diethylidene-2,4,8,10-tetraoxospiro[5,5]undecane (DETOSU) with N-(3-hydroxypropyl)-γ-hydroxybutyramide (AD) and 1,10-decanediol (DD):

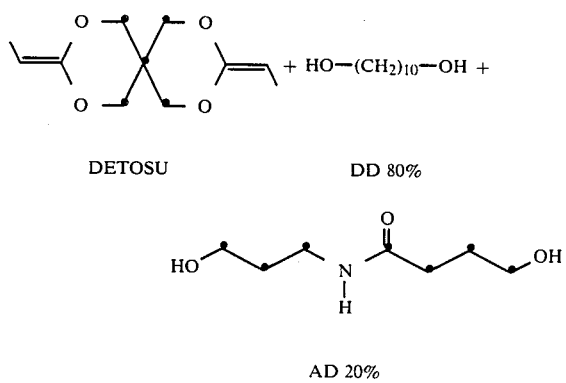

DETOSU          DD 80%

AD 20%

The ratio of DD to AD is 80/20. To a flame-dried flask was added via syringe DETOSU (4.79 g, 0.022 moles) and 1,10-decanediol (3.94 g, 0.022 moles). Dioxane freshly distilled from sodium (20 ml) was added and the mixture was heated (under N₂) at reflux for 12 hours. The mixture was allowed to cool to 60° C. and DETOSU (1.20 g, 0.0056 moles) and the AD diol (0.912 g, 0.0056 moles) were added. The mixture was heated at reflux for 10 hours, then it was poured into a TEFLON dish and placed in a vacuum oven at 70° C. for 24 hours. There were obtained 11 g of elastomeric polymer containing alternating blocks of the following structures:

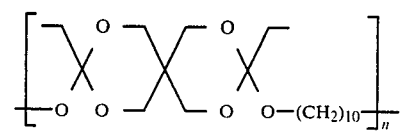

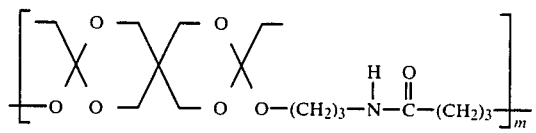

EXAMPLE 2

Employing the same procedure and starting materials as in Example 1, by using 70% DD and 30% AD a polymer with different properties is obtained.

EXAMPLE 3

The block copolymerization of 3,9-diethylidene-2,4,8,10-tetraoxospiro[5,5]undecane (DETOSU) with N,N'-bis(2-hydroxyethyl)terephthalamide (TAMD) and 1,10-decanediol (DD).

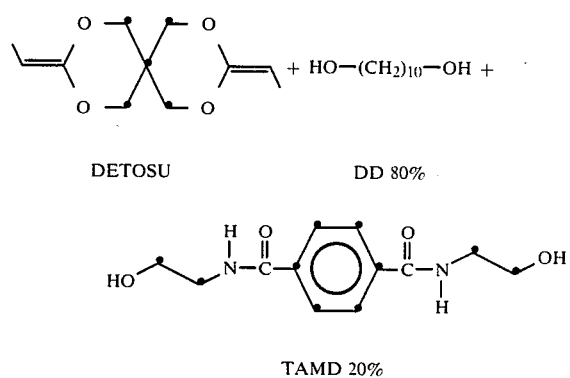

DETOSU          DD 80%

TAMD 20%

The ratio of DD to TAMD is 80/20. To a flame-dried flask was added DETOSU (5.03 g, 0.0237 moles) and 1,10-decanediol (4.13 g, 0.237 moles) followed by 15 ml of freshly distilled (from sodium) dioxane. The mixture was heated at reflux for 10 hours then allowed to cool to 60° C. DETOSU (1.25 g, 0.0059 moles) and the TAMD diol (1.495 g, 0.0059 moles) were added and the mixture was again heated at reflux for ~ 10 hours; it was then poured into a TEFLON dish and placed in a vacuum oven at 70° C. for 24 hours. There were obtained 10 g of a tough elastomer containing blocks of the following structure:

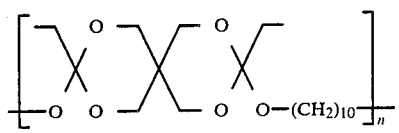

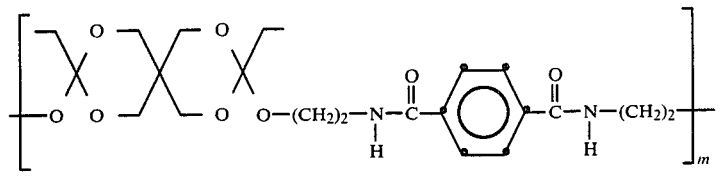

EXAMPLE 4

Employing the same procedure and starting materials as in Example 3, but using 90% DD and 10% TAMD a polymer with different properties was obtained.

EXAMPLE 5

The procedure of Example 1 was followed using DETOSU, 80% 1,6-hexane diol and 20% AD.

EXAMPLE 6

The procedure of Example 1 was followed using DETOSU, 80% 1,10-DD and 20% N,N'-bis(2-hydroxyethyl)oxamide.

EXAMPLE 7

The procedure of Example 1 was followed using DETOSU, 80% 1,10-DD and 20% bis-(2-hydroxyethyl)-ethylenedicarbamate.

EXAMPLE 8

The procedure of Example 1 was followed using DETOSU, 80% 1,10-DD, 10% TAMD and 10% 2-ethyl-2-(hydroxymethyl)-1,3-propanediol (EHMPD).

EXAMPLE 9

The procedure of Example 1 was followed using DETOSU, 89% 1,10-DD, 10% TAMD and 1% EHMPD.

EXAMPLE 10

The procedure of Example 1 was followed using DETOSU, 78% 1,10-DD, 10% TAMD, 2% EHMPD and 10% trans cyclohexane dimethanol.

EXAMPLE 11

The procedure of Example 1 was followed using DETOSU, 60% 1,10-DD and 40% TAMD.

EXAMPLE 12

The procedure of Example 1 was followed using DETOSU, 60% 1,6-hexanediol, 35% trans cyclohexane dimethanol and 5% EHMPD.

What is claimed is:

1. A bioerodible poly(ortho ester) thermoplastic elastomer prepared from:
   (A) a diketene diacetal;
   (B) a long-chain non-polar, flexible diol containing 4 to 22 carbon atoms and
   (C) a diol containing at least one functional group which results in hydrogen bonding or other association selected from the group consisting of amide, urethane, urea and imide groups.

2. The elastomer of claim 1 wherein said long-chain, non-polar, flexible diol is 1,10-decane diol.

3. The elastomer of claim 1 wherein said amide containing diol is an amide selected from the group consisting of N-(3-hydroxypropyl)-γ-hydroxybutyramide and N,N'-bis(2-hydroxyethyl)-terephthalamide.

4. A bioerodible poly(ortho ester thermoplastic elastomer prepared from:
   (A) 60 to 95%, by weight, based on the total weight of the polymer produced, of a flexible segment prepared from a diketene diacetal and a long chain, non-polar, flexible diol containing 4 to 22 carbon atoms; and
   (B) 5 to 40%, by weight, based on the total weight of the polymer produced, of a rigid segment prepared from a diketene diacetal and a rigid diol containing at least one functional group which results in hydrogen bonding or other association selected from the group consisting of amide, urethane, urea and imide groups.

* * * * *